(12) United States Patent
Patrick

(10) Patent No.: US 9,307,383 B1
(45) Date of Patent: Apr. 5, 2016

(54) REQUEST APPARATUS FOR DELIVERY OF MEDICAL SUPPORT IMPLEMENT BY UAV

(71) Applicant: Google Inc., Mountain View, CA (US)

(72) Inventor: William Graham Patrick, Mountain View, CA (US)

(73) Assignee: Google Inc., Mountain View, CA (US)

( * ) Notice: Subject to any disclaimer, the term of this patent is extended or adjusted under 35 U.S.C. 154(b) by 83 days.

(21) Appl. No.: 13/916,328

(22) Filed: Jun. 12, 2013

(51) Int. Cl.
*H04M 11/04* (2006.01)
*H04W 4/22* (2009.01)

(52) U.S. Cl.
CPC ........................................ *H04W 4/22* (2013.01)

(58) Field of Classification Search
CPC . H04W 76/007; B60R 16/0315; G08B 21/22; G06Q 30/02; H04L 29/06; H04L 29/08072; A61B 5/0002; A61B 19/22; G05B 23/027; G06F 21/34
USPC .............. 455/404.1; 340/3.1, 573.1; 235/375; 370/401; 600/300, 301; 606/1; 700/80; 709/201; 726/9
See application file for complete search history.

(56) References Cited

U.S. PATENT DOCUMENTS

| | | | |
|---|---|---|---|
| 6,044,257 A | 3/2000 | Boling et al. | |
| 6,563,910 B2 | 5/2003 | Menard et al. | |
| 6,608,559 B1 | 8/2003 | Lemelson et al. | |
| 6,937,150 B2 | 8/2005 | Medema et al. | |
| 7,120,488 B2 | 10/2006 | Nova et al. | |
| 7,194,298 B2 | 3/2007 | Massicotte et al. | |
| 7,400,249 B2 | 7/2008 | Monroe | |
| 7,642,909 B2 | 1/2010 | Acar | |
| 7,755,496 B1 | 7/2010 | Bernstein | |
| 7,944,353 B2 | 5/2011 | Grim, III et al. | |
| 8,013,734 B2 | 9/2011 | Saigh et al. | |
| 8,064,412 B2 | 11/2011 | Petite | |
| 8,103,523 B2 | 1/2012 | Clawson | |
| 8,335,298 B2 | 12/2012 | Clawson | |
| 8,355,483 B2 | 1/2013 | Clawson | |
| 2005/0038696 A1* | 2/2005 | Kalevik et al. | 705/13 |
| 2005/0201397 A1* | 9/2005 | Petite | 370/401 |

(Continued)

FOREIGN PATENT DOCUMENTS

WO 2012/022276 2/2012

OTHER PUBLICATIONS

Debusk Wesley, et al., "Dispatch Interface for Integration of Unmanned Aer Systems into Public Safety Services," AIAA Infotech, Aerospace, Apr. 2010.

(Continued)

*Primary Examiner* — Charles Appiah
*Assistant Examiner* — Alexander Yi
(74) *Attorney, Agent, or Firm* — McDonnell Boehnen Hulbert & Berghoff LLP

(57) ABSTRACT

An illustrative apparatus may include a UAV request apparatus having a housing with at least one interface configured to accept one or more inputs that are each indicative of a particular type of medical situation. A control system may be configured to receive, via the interface, a first input that corresponds to a first type of medical situation in which a defibrillator is configured to provide medical support; and send, via a first network interface to an access system for a network of UAVs, a medical support request including a unique electronic identifier for the apparatus and an indication of the first type of medical situation, such that a UAV delivers a defibrillator to a location associated with the unique electronic identifier.

21 Claims, 10 Drawing Sheets

(56) References Cited

U.S. PATENT DOCUMENTS

| | | |
|---|---|---|
| 2006/0154642 A1* | 7/2006 | Scannell, Jr. ............... 455/404.1 |
| 2007/0057798 A1 | 3/2007 | Li et al. |
| 2008/0085696 A1 | 4/2008 | Salahshour et al. |
| 2010/0291894 A1 | 11/2010 | Pipes |
| 2011/0064204 A1* | 3/2011 | Clawson ........................ 379/45 |
| 2011/0111736 A1 | 5/2011 | Dalton et al. |
| 2011/0130636 A1* | 6/2011 | Daniel et al. ................. 600/301 |
| 2011/0230161 A1* | 9/2011 | Newman .................... 455/404.1 |
| 2012/0064855 A1 | 3/2012 | Mendelson |
| 2012/0149353 A1 | 6/2012 | Helfrich |
| 2012/0157034 A1 | 6/2012 | Martin et al. |
| 2012/0250833 A1 | 10/2012 | Smith et al. |
| 2012/0254345 A1* | 10/2012 | Montoya ....................... 709/217 |
| 2014/0018779 A1* | 1/2014 | Worrell et al. .................... 606/1 |

OTHER PUBLICATIONS

Monahan, Torin et al., "Crowdsourcing Urban Surveillance: The Development of Homeland Security Markets for Environmental Sensor Networks," Geoforum, 2013, pp. 1-10.

Rodriguez, Pedro A., et al., "An Emergency Response UAV Surveillance System," AMIA, 2006, Symposium Proceedings, p. 1078.

\* cited by examiner

REQUEST APPARATUS FOR DELIVERY OF MEDICAL SUPPORT IMPLEMENT BY UAV

BACKGROUND

Unless otherwise indicated herein, the materials described in this section are not prior art to the claims in this application and are not admitted to be prior art by inclusion in this section.

Access to medical support implements, such as defibrillators, inhalers and drugs like epinephrine and insulin, may be critical to those in emergency medical situations. Further, expedient access to or delivery of such medical support implements may be particularly important in cases of cardiac distress or anaphylactic shock where mere minutes can make a difference in saving a person's life. Typically, when a medical emergency occurs in a residential, commercial or public setting (i.e., outside of a hospital or other healthcare facility), the person experiencing the emergency or a bystander will call 911 or another emergency medical service and wait for help to arrive, or will locate the nearest First-Aid kit or Automated External Defibrillator (AED) and attempt to provide medical assistance.

This construct may have certain disadvantages to both the person experiencing the medical emergency and the homeowner or entity that owns, leases or manages a public or commercial facility. For example, the medical support implement(s) necessary to respond to or provide treatment in a medical emergency may not be readily available or easily accessible at the site of the emergency. Generally, drugs such as epinephrine and insulin are not kept in commercial or public buildings. While AEDs are required by law to be placed in certain public and commercial spaces, they may not be present in the immediate area of an emergency when it occurs and may be hard to locate, may not be functioning properly due to lack of proper maintenance, or may not include sufficient instructions for a layperson to provide adequate assistance. If an emergency medical service is called, it can take up to 20 seconds for the dispatcher to even pick up the call and then can take another seven to nine minutes for a first responder to arrive to provide emergency medical care.

Further, the cost to purchase, install and maintain AEDs or other medical support implements in a public or commercial place can be significant. For example, an AED may cost around $2,000-$3,000 just to install and laws may require multiple AEDs to be placed within a building or other large space. Moreover, typical AEDs must be manually maintained, requiring maintenance personnel to periodically visit to the site at which it is installed, levying additional burden and cost to the building or facility owner. Such costs would also likely be prohibitive to an individual desiring to have access to an AED in his or her residence.

SUMMARY

In one aspect, an exemplary apparatus may include: (a) a housing having at least one interface configured to accept one or more inputs that are each indicative of a particular type of medical situation; (b) a first network interface that is operable to communicate with an access system for a network of unmanned aerial vehicles (UAVs) that are configured for medical support, wherein at least one of the UAVs is configured to deliver a defibrillator; and (c) a control system configured to: (i) receive, via the at least one interface, a first input that corresponds to a first type of medical situation in which a defibrillator is configured to provide medical support; and (ii) in response to receipt of the first input, send a medical-support request to the access system via the first network interface, wherein the medical-support request comprises a unique electronic identifier for the apparatus and an indication of the first type of medical situation, such that a UAV delivers a defibrillator to a location associated with the unique electronic identifier. The apparatus may, in a further embodiment, include at least one display disposed on the housing. In some embodiments, the display may be detachable from the housing, but may remain locked to the housing until receipt of a first input by the control system. The at least one interface may be a touch-screen interface or one or more push-buttons. The housing may be installed at a known and stationary location. The first network interface may be one of: a plain old telephone service (POTS) network, a wireless network, a cellular network, a fiber network and a data network.

In a further aspect, a non-transitory computer readable medium may have stored therein instructions that are executable to cause a control system to perform functions comprising: (a) receiving, via an interface of an apparatus, a first input that corresponds to a first type of medical situation in which a defibrillator is configured to provide medical support; and (b) in response to receipt of the first input, sending, via a network interface, a medical-support request to an access system for a network of unmanned aerial vehicles (UAVs) that are configured for medical support, wherein the medical-support request comprises a unique electronic identifier for the apparatus and an indication of the first type of medical situation, such that a UAV delivers a defibrillator to a location associated with the unique electronic identifier. The interface may be configured to accept one or more inputs that are each indicative of a particular type of medical situation.

These as well as other aspects, advantages, and alternatives, will become apparent to those of ordinary skill in the art by reading the following detailed description, with reference where appropriate to the accompanying drawings.

DETAILED DESCRIPTION

Figure 1:
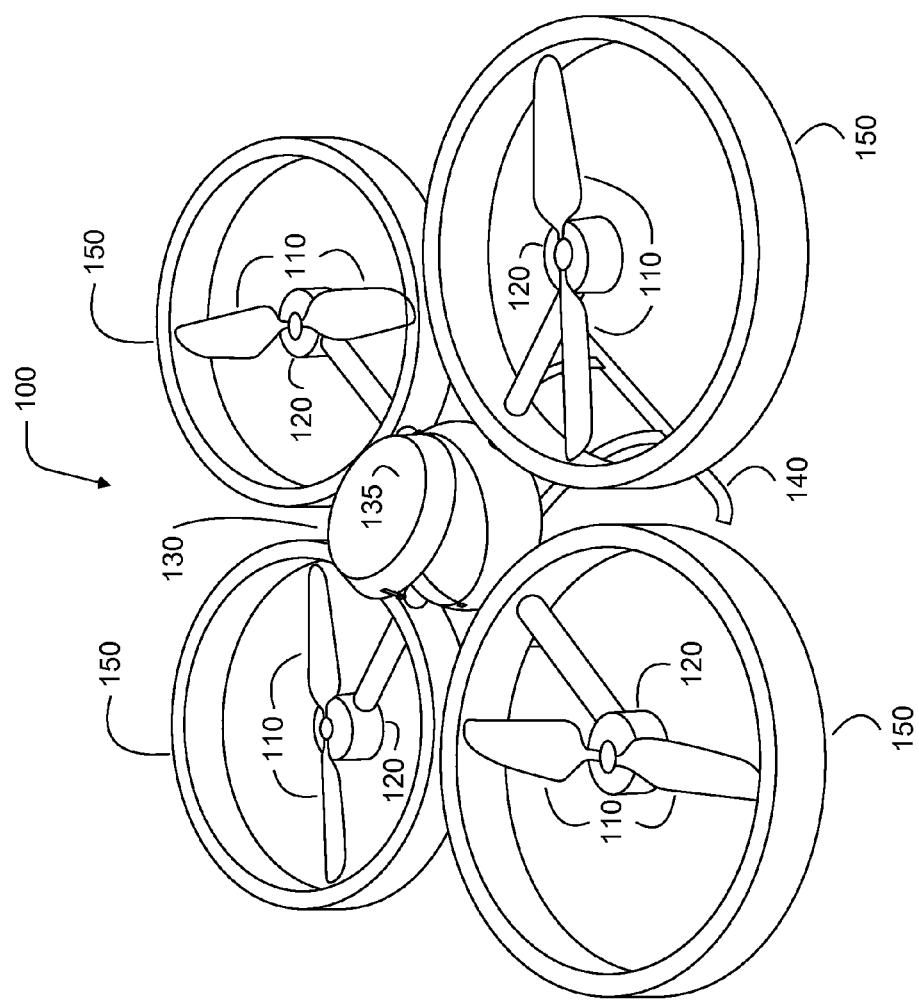
FIGS. 1, 2, 3A, and 3B are simplified illustrations of unmanned aerial vehicles, according to example embodiments.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. OVERVIEW

Embodiments described herein may relate to or may be implemented in conjunction with a system in which unmanned vehicles, and in particular, "unmanned aerial vehicles" (UAVs), are configured to provide medical support. A medical-support system including one or more UAVs may be used to deliver medical support implements from a remote location to those in need of emergency medical assistance. The system may include one or more UAVs positioned at known locations throughout a city or geographic area.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode. Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

In an illustrative embodiment, the medical-support system may be accessed via an apparatus, such as a UAV request apparatus, that can be placed within public or commercial buildings or spaces. The apparatus may include at least one interface, which may include interface features such as push-buttons, handles, levers and/or a touch-screen interface that are configured to accept one or more inputs that are each indicative of a particular type of medical situation. Simple interface features may each designate a particular medical situation for which medical support by a UAV may be requested. For example, an example apparatus may allow a user to request that a UAV provide support for specific types of medical emergencies such as cardiac arrest, allergic reaction, diabetic shock, trouble breathing, asthma, broken bone, etc. Alternatively, an example apparatus may allow a user to request that a UAV deliver specific medical support implements or items, such as an AED, epinephrine, insulin, an inhaler, a splint, a First-Aid kit, etc. In one example, an apparatus may be configured to request that a UAV deliver a defibrillator.

Such an apparatus may also be provided with a first network interface, such as a plain old telephone service (POTS) connection, a wireless network connection, or a fiber or internet connection, which is configured to communicate with an access and/or dispatch system for a network of medical-support UAVs. A second network interface may also be provided such that the apparatus may conduct automated maintenance, such as checking connectivity, performing self-diagnostics, etc. A display configured to display still and/or video images may also be provided on the apparatus housing.

In the event of a medical emergency, the person in need of support, or someone on behalf of that person, may locate the closest example apparatus and request medical support from a UAV via an interface of the apparatus. Specifically, the interface may be used to indicate a particular medical situation. For example, in the case of a person suffering from a cardiac arrest, a bystander may quickly locate the nearest UAV request apparatus and input a request, via the interface, that a UAV deliver an AED to the site of the medical emergency. The interface of the example apparatus may be configured to allow for fast and easy identification and selection of the particular medical emergency, or medical support implement necessary to address the particular medical emergency, such as with easy to read knobs, switches, or touch-sensitive controls.

In response to receiving such input, the apparatus automatically sends a medical-support request to the access system indicating the type of medical situation via the first network interface, which may help to eliminate the twenty seconds it typically takes, on average, for a person dialing 911 to even be connected with an operator or dispatcher. The medical-support request may also include the unique electronic identifier associated with the UAV request apparatus from which the request was sent. Because the exact location of each UAV request apparatus is known based on where it is installed, communication of the unique electronic identifier to the access system is a communication of the location of the UAV request apparatus. The unique electronic identifier may be a "phone" number or IP address, depending on the type of connection (e.g., phone, fiber or internet) used.

Upon receiving the medical-support request, a UAV will be selected that is configured to assist in or provide medical support for the input medical situation(s). For example, in response to a medical support request indicating that a person is experiencing cardiac arrest, a UAV configured with a defibrillator is then deployed from, for example, the nearest dispatch facility. UAVs may be positioned around a geographic area such that they can arrive at the site of any UAV request apparatus within a certain amount of time, for example, within the amount of time recognized by the medical community as critical for a person suffering from a particular emergency medical situation should receive medical assistance. For instance, UAVs configured to deliver AEDs may be positioned around a city such that time to delivery would be no more than 90-120 seconds from receipt of a medical support request.

Studies have shown that without defibrillation, approximately 95 percent of cardiac arrest victims die before reaching a hospital. Further, at the onset of cardiac arrest, the chances of survival are reduced by seven to ten percent for every minute that passes without defibrillation, which is the process of sending an electric shock to the heart to restore a normal heartbeat and reverse cardiac arrest. After ten minutes, survival is unlikely. (See, e.g., American Heart Association, 2004, Sudden Deaths From Cardiac Arrest—Statistics (available at americanheart.org; Eisenberg M S, Cummins R O, Damon S, Larsen M P, Hearne T R. Survival rates from out-of-hospital cardiac arrest: recommendations for uniform definitions and data to report. Ann Emerg Med. 1990; 19:1249-1259; Eisenberg M S, Copass M K, Hallstrom A, Cobb L A, Bergner L. Management of out-of-hospital cardiac arrest: failure of basic emergency medical technician services. JAMA. 1980; 243:1049-1051).

Such critical timing may not be achievable in conventional emergency medical response systems, such as with ambulances or manned helicopters, where road traffic and personnel staffing are at issue. For example, if it takes 8-9 minutes for an EMS unit such as an ambulance or fire truck to arrive at the site of the emergency under normal circumstances, the first 60-120 seconds of that time may involve the dispatch (e.g., calling 9-1-1, speaking to an operator, etc.). A UAV, on the other hand can be dispatched with an example system without the human interaction required for typical 9-1-1 emergency response, and may be able to travel faster than a ground vehicle because it does not face traffic conditions and will have less distance to cover since it can travel "as the crow flies" versus following roads.

Prior to being deployed, the chosen UAV may be loaded, either manually or automatically via a launch pad, with one or more medical support implements, including an AED, insulin, epinephrine, or an inhaler, as examples. Alternatively, the system may include a fleet with a number of different types of UAVs, which are pre-configured for different medical situations. For instance, some UAVs may be configured with items and/or functionality that are expected to be helpful in a cardiac-arrest situation, some UAVs may be configured to help a choking victim, some UAVs may be configured to help a trauma victim, and so on. The access system may select the appropriate UAV(s) from those that are available, and dispatch the selected UAV to the scene of the medical situation. The selected UAV or UAVs may autonomously navigate to the location of the UAV request apparatus, or may be navigated manually by an operator of the access system.

Upon sending the medical support request, or upon delivery of a medical support implement by a UAV, the apparatus may provide, via the video display, step-by-step instructions for assisting to the person suffering from a medical condition. This may include instructions for using the delivered medical support implement, for example, instructions for how to administer a drug, or instructions for how to use a defibrillator.

The example UAV request apparatus described herein may be less expensive to purchase, install, and maintain than traditional systems, including installed defibrillators. For example, because a UAV request apparatus does not, itself, house a medical support implement it may, therefore, present a cost savings in both purchase price and maintenance costs. Whereas the average price of an AED unit may be, e.g., thousands of dollars, the purchase price of each UAV request apparatus may be much less expensive because the components are simpler and less expensive, and/or because research and development costs for the UAV request apparatus may be significantly less than those for AEDs. The automated maintenance aspect of a UAV request apparatus may also reduce maintenance costs over traditional systems, such as installed defibrillators, which must be manually maintained. Further, example UAV request apparatuses provide greater breadth of coverage, at a lower cost, in that each apparatus can be designed to request a UAV configured to provide support for a wide variety of medical emergencies or configured to deliver a variety medical support implements. Whereas, under traditional circumstances, a different medical support implement necessary to address each medical emergency would have to be purchased and maintained on site.

Further, because of its potential affordability, example UAV request apparatuses may be more accessible to individuals for placement in their residences or dwellings. While approximately 80% of cardiac arrests occur in residences, very few AEDs are purchased for and installed in homes. Individuals at risk for cardiac arrest or afflicted with other life-threatening conditions, especially the elderly, may receive more benefit from the fast and broad coverage of an example UAV request apparatus bearing a nominal monthly subscription, versus a traditional installed AED which applies to only particular emergency situations and would require a large lump sum of several thousand dollars for installation and associated maintenance costs.

It should be understood that the above embodiments, and other embodiments described herein, are provided for explanatory purposes, and are not intended to be limiting.

Further, the term "medical situation" as used herein should be understood to include any situation to which government or private entity, such as a police department, a fire department, and/or an emergency medical services (EMS) entity, might dispatch its personnel. Therefore, some medical situations may in fact be non-medical in nature. For example, an emergency situation to which a police car, fire truck, or ambulance might be dispatched may be considered a medical situation for purposes of this disclosure. Medical support may not be required at such emergency situations (e.g., when police are sent to the scene of a non-violent crime). Further, some non-emergency situations to which a police car, fire truck, ambulance, or the like might be dispatched may also be considered a medical situation for purposes of this disclosure. Thus, while exemplary embodiments may be described as being implemented to help provide medical support at the scene of a medical situation, those skilled in the art will understand that the UAVs, the functionality of such UAVs, and/or other aspects of the embodiments that are explicitly described herein can also apply in non-medical and/or non-emergency applications.

II. ILLUSTRATIVE UNMANNED VEHICLES

The term "unmanned aerial vehicle," as used in this disclosure, refers to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 110 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself by adjusting the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible. For example, delivery mechanisms including winching from a hovering aircraft and dropping with a parachute are also contemplated.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
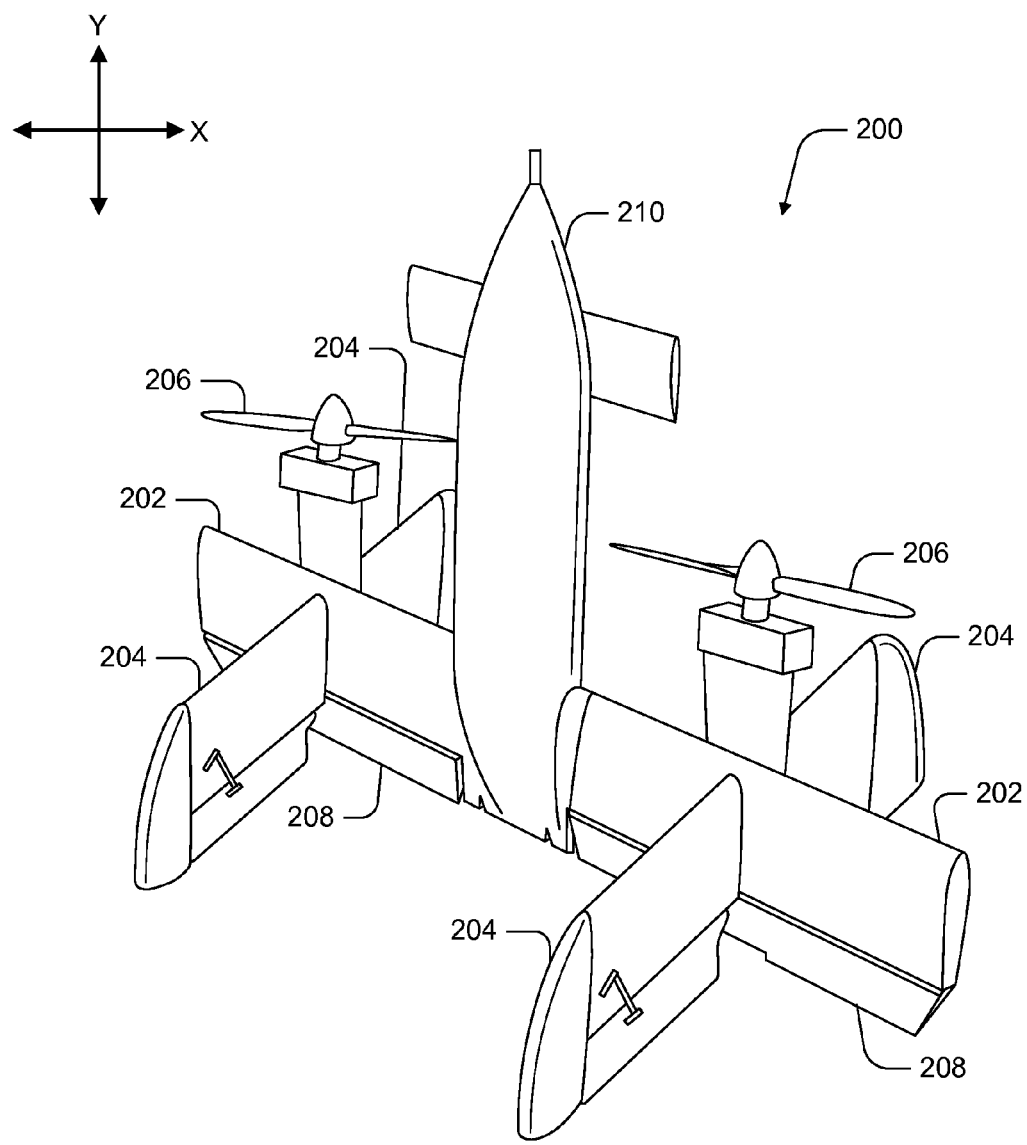

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3A and 3B are simplified illustrations of other types of UAVs, according to example embodiments.

Figure 3A:
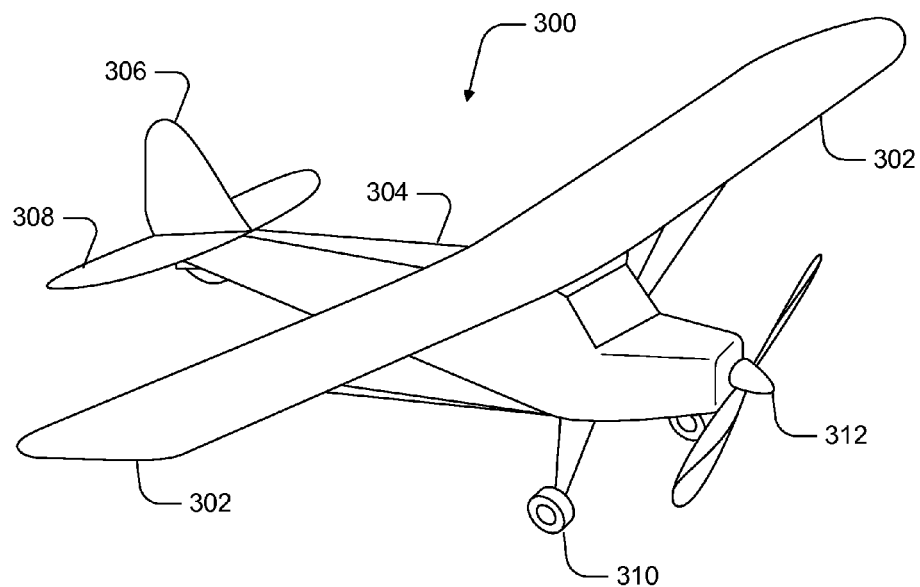

In particular, FIG. 3A shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3A depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 3B:
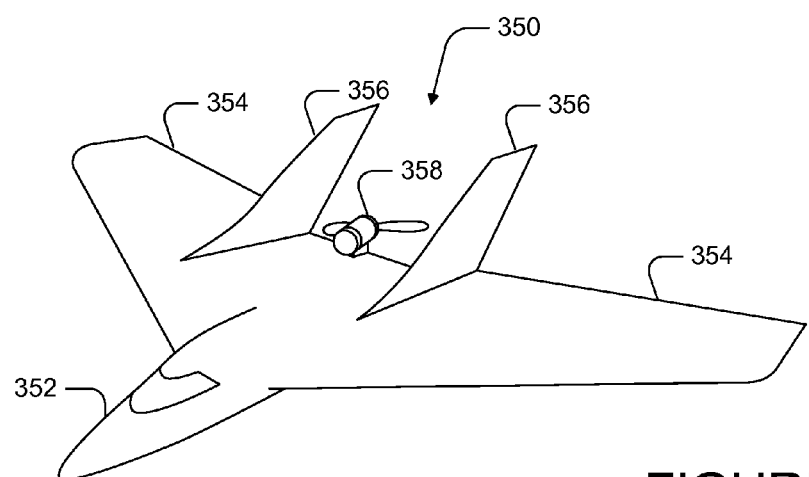

FIG. 3B shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3A, FIG. 3B depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. ILLUSTRATIVE MEDICAL SUPPORT SYSTEMS WITH UAVS

Figure 4:
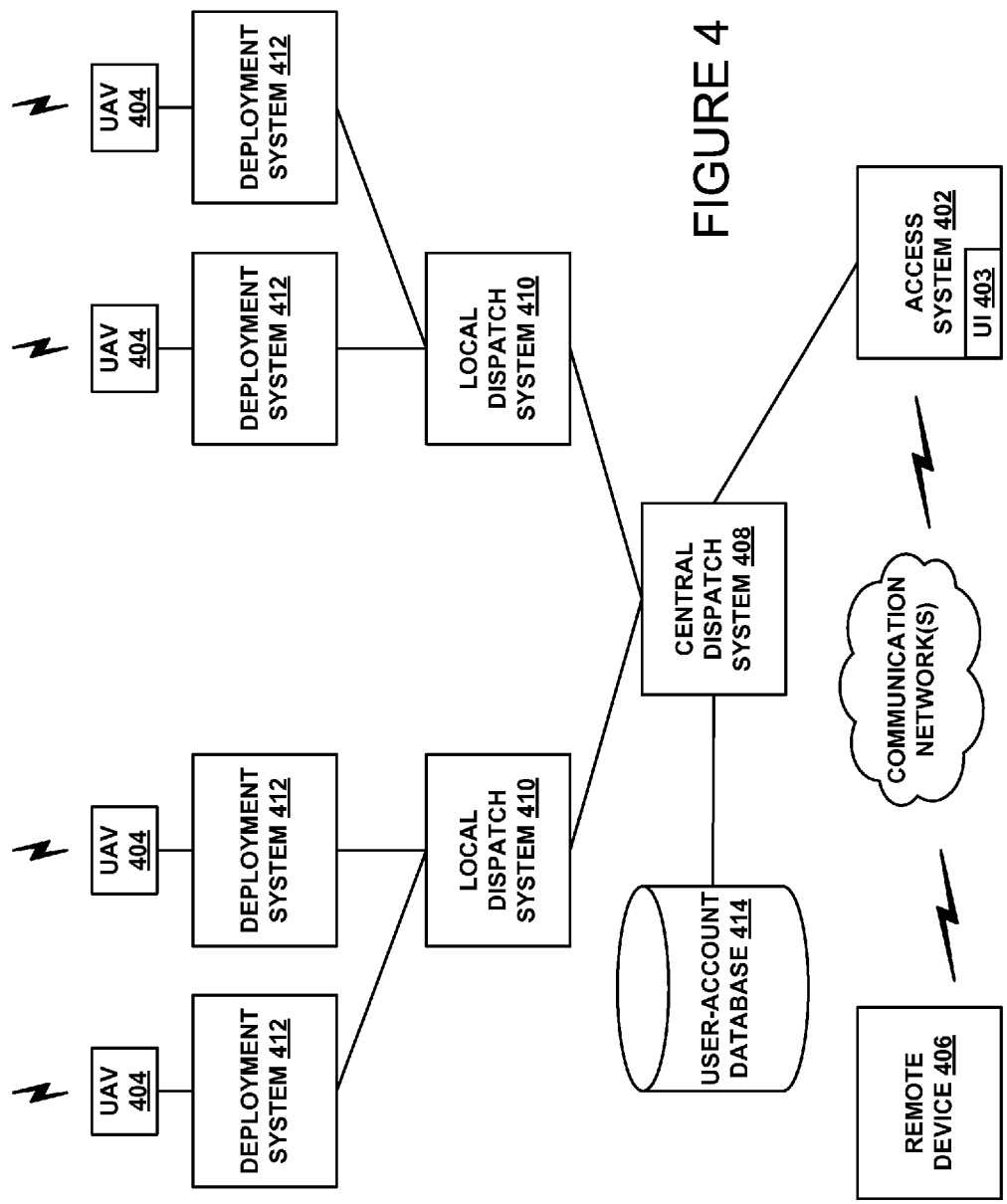
FIG. 4 is a simplified block diagram illustrating a medical support system, according to an example embodiment.

As noted above, UAVs may be deployed to provide remote medical support. FIG. 4 is a simplified block diagram illustrating a medical support system 400, according to an example embodiment.

In an illustrative medical-support system 400, an access system 402 may allow for interaction with, control of, and/or utilization of a network of medical-support UAVs 404. In some embodiments, an access system 402 may be a computing system that allows for human-controlled dispatch of UAVs 404. As such, the access system may include or otherwise provide a user interface (UI) 403 via which a user can access and/or control UAVs 404.

As a specific example, access system 402 could be a computing system at a service provider for the medical-support system, a police station or a fire station. Accordingly, a human operator at the service provider, police station, or fire station may receive an indication that a situation exists from a remote device 406, for example, a communication from a UAV request apparatus. The operator may then determine that medical support is appropriate and utilize access system 402 to dispatch one or more UAVs to provide the appropriate medical support. For example, the operator may use the UI 403 of access system 402 to request that a UAV be dispatched to the location of remote device 406.

A UI 403 of an access system 402 may provide other functionality in addition to allowing for dispatch of UAVs 404. For example, UI 403 may allow an operator to specify certain details related to the medical situation to which the UAV is being dispatched. Examples of such details may include, but are not limited to: (a) general information related to the person or persons involved in the situation, such as age, height, weight, and so on, (b) medical information related to the person or persons involved in the situation, such as medical history, known allergies, and so on, (c) information related to the medical situation itself, such as symptoms exhibited by a person, details of events surrounding the situation (e.g., a car accident), and so on, and (d) desired specifications for the UAV to be dispatched, such as medical-support capabilities, wireless-communication capabilities, and so on.

Further, an access system 402 may provide for remote operation of a UAV. For instance, an access system 402 may allow an operator to control the flight of a UAV via UI 403. As a specific example, an operator may use an access system to dispatch a UAV 404 to the scene of a medical situation. The UAV 404 may then autonomously navigate to or near the location of the identified medical situation. The operator may use the access system 402 at any point to take over control of the UAV 404, and navigate the UAV to a different location. Other examples are also possible.

In an illustrative embodiment, UAVs 404 may take various forms. For example, each UAV 404 may be a UAV such as those illustrated in FIGS. 1, 2, 3A, and 3B. However, medical support system 400 may also utilize other types of UAVs without departing from the scope of the invention. In some implementations, all UAVs 404 may be of the same or a similar configuration. However, in other implementations, UAVs 404 may include a number of different types of UAVs. For instance, UAVs 404 may include a number of types of UAVs, with each type of UAV being configured for a different type or types of medical support Remote device 406 may take various forms. Generally, a remote device 406 may be any device via which a request for medical support can be made and/or via which a situation that may require or benefit from medical support can be reported. For instance, a remote device 406 may be a mobile phone, tablet computer, laptop computer, personal computer, or any network-connected computing device. Further, in some instances, remote device 406 may not be a computing device. As an example, a standard telephone, which allows for communication via plain old telephone service (POTS), may serve as a remote device 406. Remote device 406 may be provided as a UAV request apparatus 600, and may be positioned at a stationary location, such as within a building, a residence, or public location.

As noted above, a remote device 406 may be configured to allow a user to request medical support. For example, a person may use their mobile phone, a POTS phone, a VoIP phone, or a stationary UAV request apparatus, to contact an emergency medical service (e.g., place a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 402 to dispatch a UAV 404.

In a further aspect, a remote device 406 may be configured to determine and/or provide an indication of its own location. For example, remote device 406 may include a GPS system so that it can include GPS location information (e.g., GPS coordinates) in a communication to an access system 402 and/or to a dispatch system such as central dispatch system 408. As another example, a remote device 406 may use a technique that involves triangulation (e.g., between base stations in a cellular network) to determine its location. Alternatively, another system such as a cellular network may use a technique that involves triangulation to determine the location of a remote device 406, and then send a location message to the remote device 406 to inform the remote device of its location. Other location-determination techniques are also possible. Further, as will be explained further below, if the remote device 406 is a stationary device, such as a UAV request apparatus 600 having a known location, then it may be configured to provide an indication of its own location by communicating a unique electronic identifier associated with that particular apparatus.

In an illustrative arrangement, central dispatch system 408 may be a server or group of servers, which is configured to receive dispatch messages requests and/or dispatch instructions from an access system 402. Such dispatch messages may request or instruct the central dispatch system 408 to coordinate the deployment of UAVs for remote medical support. A central dispatch system 408 may be further configured to route such requests or instructions to local dispatch systems 410. To provide such functionality, central dispatch system 408 may communicate with access system 402 via a data network, such as the Internet or a private network that is established for communications between access systems and automated dispatch systems. The central dispatch system 408 may include a fully automated or computer implemented system, and/or it may include human operators.

In the illustrated configuration, central dispatch system 408 may be configured to coordinate the dispatch of UAVs 404 from a number of different local dispatch systems 410. As such, central dispatch system 408 may keep track of which UAVs 404 are located at which local dispatch systems 410, which UAVs 404 are currently available for deployment, and/or which medical situation or situations each of the UAVs 404 is configured for. Additionally or alternatively, each local dispatch system 410 may be configured to track which of its associated UAVs 404 are currently available for deployment and/or which medical situation or situations each of its associated UAVs is configured for.

In some embodiments, when central dispatch system 408 receives a medical support request from an access system 402, central dispatch system 408 may select a specific UAV 404 to dispatch. The central dispatch system 408 may accordingly instruct the local dispatch system 410 that is associated with the selected UAV to dispatch the selected UAV. The local dispatch system 410 may then operate its associated deployment system 412 to launch the selected UAV.

As a specific example, central dispatch system 408 may receive a request for medical support that indicates a certain type of medical situation and a location where the situation is occurring. Take, for instance, a request for medical support at the home of a person who appears to have suffered from cardiac arrest. In this scenario, the central dispatch system 408 may evaluate the fleet of UAVs 404 to select the closest available UAV to the person's home that is configured to provide medical support when a heart attack has occurred. Alternatively, the central dispatch system 408 may select an available UAV that is within a certain distance from the person's home (which may or may not be the closest), and which is configured to provide medical support when cardiac arrest has occurred.

In other embodiments, a central dispatch system 408 may forward a request for medical support to a local dispatch system 410 that is near the location where the support is requested, and leave the selection of a particular UAV 404 to the local dispatch system 410. For instance, in a variation on the above example, central dispatch system 408 may forward a request for medical support at the home of a person who appears to have suffered from a heart attack to the local dispatch system 410 that is closest to, or within a certain distance from, the person's home. Upon receipt of the request, the local dispatch system 410 may then determine which of its associated UAVs is configured to provide medical support to a heart-attack victim, and deploy this UAV.

The medical-support system 400 may cause the selected UAV to travel to the target location to provide medical support. This function may be accomplished in various ways, depending upon the particular implementation.

In some embodiments, a component of the medical-support system may send a message to another entity to indicate that the selected UAV should be deployed. For example, if an access system 402 may identify the medical situation (or receive an identification of the type of medical situation from a remote UAV request apparatus), select an appropriate type of UAV, and send a message to the central dispatch system 408, which indicates that a UAV of the selected type should be dispatched to the target location. As another example, a central dispatch system 408 may identify the medical situation (or receive an identification of the type of medical situation from a remote UAV request apparatus), select an appropriate type of UAV, and send a message to the local dispatch system 408 that indicates that a UAV of the selected type should be dispatched to the target location. In either case, the central dispatch system 408 may then relay the message to the appropriate local dispatch system 410, which may operate a deployment system to launch the selected UAV.

In some embodiments, the medical-support system may send a message to instruct a deployment system to launch the selected UAV, or directly operating the deployment system to launch the selected UAV. Further, the medical-support system may prepare the selected UAV to travel to the target location, such as by determining and setting way points to allow the UAV to navigate to the target location.

Further, upon receiving a request for medical support, for example, via a UAV request apparatus, the central dispatch system 408 may also communicate to local emergency medical systems that a medical emergency has been detected. The central dispatch system 408 may also communicate to the emergency medical unit the particular type of medical emergency that has been indicated, i.e., cardiac arrest, anaphylactic shock, etc.

In further examples, the central dispatch system 408 may notify community responders of the request for medical support. For example, these community responders may be called, paged or otherwise notified on a mobile phone or computer with the details and location of the medical emergency so that they may travel to the scene and provide assistance. These community responders may be volunteers. In the alternative, a user account associated with the remote device 406, such as a UAV request apparatus, may specify that certain persons (i.e., emergency contacts, next door neighbors) should be contacted so that they may be automatically notified that a medical emergency has occurred.

A medical-support system 400 may include or have access to a number of different types of UAVs, which are configured to provide medical support in various different medical scenarios. As such, different UAVs may be said to have a different "medical-support configurations." A medical-support system may select a UAV that has a medical-support configuration that is likely to provide or assist in providing medical support for the particular medical situation. Alternatively or additionally, the medical support system 400 may have access to UAVs which do not have a particular "medical-support configuration," but may be loaded a particular medical support implement prior to deployment.

In some cases, the medical-support configuration of a given type of UAV may include a package of one or more items that are designed to provide or assist in providing medical support for a certain medical situation. For example, a given type of UAV could include Aspirin and a defibrillator, and thus might be selected as an appropriate UAV to deploy when the medical-support system receives an indication that a heart attack or cardiac arrest is occurring or has just occurred. Many other examples are also possible. The package may be loaded on or into the UAV prior to deployment.

Additionally or alternatively, the medical-support configuration of a given type of UAV may include one or more operational functions that are designed to provide or assist in medical support for the remote medical situation. For instance, a UAV may include wireless communication capabilities that allow remote medical personnel to assist those at the scene. For instance, a UAV might include in its package, a mobile phone or HMD, via which a bystander can communicate with and receive instructions from remote medical personnel, such that the bystander can be informed how to, e.g., provide care to a person who is injured or is suffering from a medical condition. As another example, a UAV may include program logic (e.g., medical support module(s) 416) that allows the UAV to perform certain diagnostic tests, in which the UAV analyzes data acquired from certain sensory systems of the UAV. Other examples are also possible.

In some embodiments, the selection of a UAV may be based, at least in part, on the particular person to whom medical support is going to be provided. For example, the medical-support system may determine that a particular user-account is associated with the medical situation. The medical-support system may then determine a service level for the particular user-account, and use the service level as a basis to select the UAV.

For example, there may be several UAVs that could be deployed to provide medical support in a particular medical situation. However, for various reasons, a particular one of the UAVs may only be deployed to someone who was paid for or otherwise is entitled to a higher service level. Accordingly, the particular UAV may only be selected if a person involved in the medical situation is authorized for the higher service level. Note that in some cases, the service level attributed to a particular communication may be that to which the person to whom the medical support is being provided by a UAV (e.g., the victim of an accident) is entitled. However, in other cases, the service level may be that of someone other than a person in need of medical care. For example, a family member, friend, or even a bystander to a medical situation, may have a particular service level that allows them to request medical support corresponding to the particular service level, on the behalf of another person in need.

The particular user-account may be determined in various ways. For example, a person may link their computing devices, such as their mobile phones, to a user-account for medical support. Accordingly, the medical-support system may determine an identification number for the remote device that provides the indication of the medical situation, and use the identification number to look up the associated medical-support user-account. Alternatively, the person who requests medical support may provide identification and/or log-in information, so that a medical-support user-account may be identified and/or verified by the medical-support system. Other techniques for determining the particular user-account are also possible.

In a further aspect, medical history and/or other information related to the particular person in need of medical support may be utilized to select an appropriate UAV. For example, delivery of prescription medications by non-physicians may be strictly regulated, even in emergency situations. To facilitate the verification and delivery of such medications, a medical-support system may include an opt-in registry, which includes persons' names and a list of medications for which each person has a current prescription. To facilitate diagnosis, the opt-in registry may further include a list of an individual's known medical conditions that may lead to emergency care. In practice, a given user-account may indicate such prescription-authorization information, known medical conditions, and/or other medical information for the person. Accordingly, a medical-support system may access the user-account for a person in need of medical support to determine whether or not they have a prescription for a particular medication, such that a UAV including the particular medication can be dispatched.

In an example configuration, a local dispatch system 410 may be implemented in a computing system at the same location as the deployment system or systems 412 that it controls. For example, in some embodiments, a local dispatch system 410 could be implemented by a computing system at a building, such as a fire station, where the deployment systems 412 and UAVs 404 that are associated with the particular local dispatch system 410 are also located. In other embodiments, a local dispatch system 410 could be implemented at a location that is remote to its associated deployment systems 412 and UAVs 404.

Numerous variations on and alternatives to the illustrated configuration of medical support system 400 are possible. For example, in some embodiments, the remote device 406 could communicate a request medical support directly to a central dispatch system 408. Further, in some implementations, some or all of the functionality that is attributed herein to central dispatch system 408, local dispatch system(s) 410, access system 402, and/or deployment system(s) 412 could be combined in a single system, implemented in a more complex system, and/or redistributed among central dispatch system 408, local dispatch system(s) 410, access system 402, and/or deployment system(s) 412 in various ways.

Yet further, while each local dispatch system 410 is shown as having two associated deployment systems, a given local dispatch system 410 may have more or less associated deployment systems. Similarly, while central dispatch system 408 is shown as being in communication with two local dispatch systems 410, a central dispatch system may be in communication with more or less local dispatch systems 410.

In a further aspect, a deployment system 412 may take various forms. In general, a deployment system may take the form of or include a system for physically launching a UAV 404. Further, a deployment system 412 may be configured to launch one particular UAV 404, or to launch multiple UAVs 404. A deployment system 412 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 412 and their corresponding UAVs 404 (and possibly associated local dispatch systems 410) may be strategically distributed throughout an area such as a city. For example, deployment systems 412 may be located on the roofs of certain municipal buildings, such as fire stations, which can thus serve as the dispatch locations for UAVs 404. Fire stations may function well for UAV dispatch, as fire stations tend to be distributed well with respect to population density, their roofs tend to be flat, and the use of firehouse roofs as leased spaces for UAV dispatch could further the public good. However, deployment systems 412 (and possibly the local dispatch systems 410) may be distributed in other ways, depending upon the particular implementation.

In a further aspect, a medical-support system 400 may include or have access to a user-account database 414. The user-account database 414 may include data for a number of user-accounts, which are each associated with one or more person or other subscribing entity, such as a building owner, corporation or local government. For a given user-account, the user-account database 414 may include data related to the associated person(s) or entity, such as a persons' medical history. Note that the medical-support system may only acquire, store, and utilize data related to a person with that person's explicit permission to do so.

Further, in some embodiments, a person or entity may have to register for a user-account with the medical-support system 400 in order to use or be provided with medical support by the UAVs 404 of medical-support system 400. As such, the user-account database 414 may include authorization information for a given user-account (e.g., a user-name and password), and/or other information that may be used to authorize access to a user-account.

In some embodiments, a person may associate one or more of their devices with their user-account, such that they can be provided with access to the services of medical-support system 400. For example, when a person uses an associated mobile phone to, e.g., place a call to an operator of access system 402 or sends a message requesting medical support to a dispatch system, the phone may be identified via a unique device identification number, and the call or message may then be attributed to the associated user-account. In addition or in the alternative to being an authorization mechanism, identifying the user-account may allow information such as the person's medical history to be used in responding to their request for medical support.

Further, in embodiments where the remote device is a UAV request apparatus 600, one or more UAV request apparatuses may be associated with a user account. For example, when a person uses an associated UAV request apparatus to send a medical-support request to a dispatch system, the UAV request apparatus may be identified via a unique device identification number, and the medical-support request may then be attributed to the associated user-account.

In a further aspect, the user-account database 414 may include data indicating a service level for each user. More specifically, a medical-support system 400 may provide service according to a number of different service levels, which correspond to different types of medical support. For example, a higher service level may: (a) provide access to additional types of UAVs, (b) provide medical support for additional medical situations, (c) provide access to improved support for a given medical situation, and/or (d) have priority as far as response time to requests for medical support, as compared to a lower service level. Other differences between a higher and lower service level are also possible.

In some embodiments, there may be no individual user accounts associated with a medical system; or, user accounts may exist but may not be used for purposes of determining whether a person should be provided medical support and/or for purposes of determining the quality of medical support that should be provided. For example, a medical support system may be implemented by a municipality or another public entity to provide medical support to citizens for free or at an equal cost. In another example, a medical support system may be implemented by a service provider in which persons or entities purchase a UAV request apparatus 600 for installation in their home, commercial building, etc., and the service provider provides medical support to all persons or entities having purchased a UAV request apparatus. Other examples are also possible.

IV. ILLUSTRATIVE COMPONENTS OF A MEDICAL-SUPPORT UAV

Figure 5:
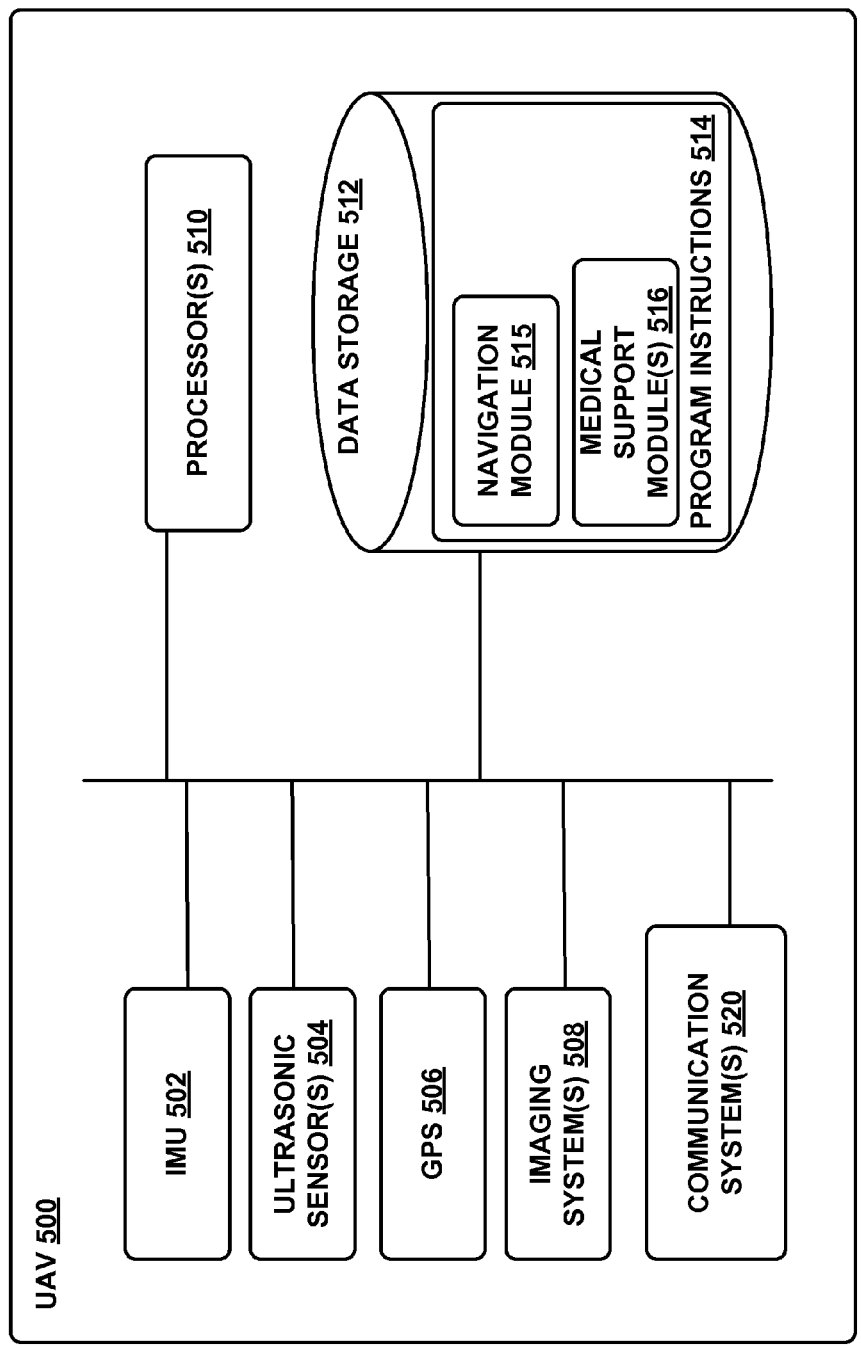
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 100, 200, 300, and 350 shown in FIGS. 1, 2, 3A, and 3B. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV functionality described herein. For instance, in the illustrated embodiment, program instructions 514 include a navigation module 515 and one or more medical-support modules 516.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 500 also includes a GPS receiver 506. The GPS receiver 506 may be configured to provide data that is typical of well-known GPS systems, such as the GPS coordinates of the UAV 500. Such GPS data may be utilized by the UAV 500 for various functions. For example, the GPS coordinates of the UAV request apparatus at which medical support was requested may be communicated to the UAV. As such, the UAV may use its GPS receiver 506 to help navigate to the UAV request apparatus's location, as indicated, at least in part, by the provided GPS coordinates. Other examples are also possible.

UAV 500 may also include one or more imaging system(s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAVs environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., rotors 110 of UAV 100).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to more precisely navigate to the scene of a medical situation. More specifically, it may be desirable in certain situations for a UAV to be close to the person in need of medical support (e.g., within reach of the person), so as to properly provide medical support to the person. To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 500 may navigate to the general area of a person in need using waypoints that are pre-determined based on GPS coordinates provided by a remote device at the scene of the medical situation. The UAV may then switch to mode in which it utilizes a localization process to locate and travel to a specific location of the person in need. For example, if a person is having a heart attack at a large stadium, a UAV 500 carrying a medical package may need to be within reach of the person or someone near the person so that she can take items from the package. However, a GPS signal may only get a UAV so far, e.g., to the stadium. A more precise location-determination technique may then be used to find the specific location of the person within the stadium. Further, the person in need of medical assistance may not be located near the location of the UAV request apparatus from which the medical-support request was sent.

Various types of location-determination techniques may be used to accomplish localization of a person once a UAV 500 has navigated to the general area of the person, or to the location of the UAV request apparatus that sent the medical support request. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a person.

As another example, once the UAV 500 reaches the general area of the person or UAV request apparatus, the UAV 500 may switch to a "fly-by-wire" mode where it is controlled, at least in part, by a remote operator, who can navigate the UAV 500 to the specific location of the person in need. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

As yet another example, the UAV 500 may include a module that is able to signal to a passer-by for assistance in either reaching the specific location or delivering its medical-support items to the medical situation; for example, by displaying a visual message in a graphic display, playing an audio message or tone through speakers, flashing a light, or performing a combination of such functions. Such visual or audio message might indicate that assistance is needed in delivering the UAV 500 to the person in need, and might provide information to assist the passer-by in delivering the UAV 500 to the person, such a description of the person, the person's name, and/or a description of the person's specific location, among other possibilities. This implementation can be useful in a scenario in which the UAV is unable to use sensory functions or another location-determination technique to determine the specific location of the person.

As an additional example, once a UAV 500 arrives at the general area of the medical situation, the UAV may utilize a beacon from the remote device (e.g., the mobile phone of a person who called for medical support, or the UAV request apparatus that sent the medical-support request) to locate the person in need of assistance. Such a beacon may take various forms. As an example, consider the scenario where a remote device, such as the mobile phone of a person in need or a bystander or a UAV request apparatus, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a remote device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

In another example, the remote computing device may include a database or other file storage containing pre-determined flight paths for each of the UAVs in the system. If the origin location of each UAV in the fleet is known and the target location of each UAV request apparatus in the system known, then a flight path from each UAV origin location to each UAV request apparatus location may be pre-determined and stored in a database. Once a particular UAV request apparatus has sent a medical-support request and a UAV 404 has been selected for deployment, then the remote computing device can retrieve a pre-determined flight path from the database and cause the selected UAV to navigate to the location of the UAV request apparatus.

C. Communication Systems

In a further aspect, UAV 500 includes one or more communication systems 520. The communications systems 520 may include one or more wireless interfaces and/or one or more wireline interfaces, which allow UAV 500 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 520 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a WiFi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

D. Power Systems

In a further aspect, UAV 500 may include power system(s) 521. A power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery.

E. Medical-Support Functionality

As noted above, UAV 500 may include one or more medical-support modules 516. The one or more medical-support modules 516 include software, firmware, and/or hardware that may help to provide or assist in the provision of the medical-support functionality described herein.

Configured as such, a UAV 500 may provide medical support in various ways. For instance, a UAV 500 may have stored information that can be provided to a person or persons at the target location, in order to assist the person or persons in providing medical care. For example, a UAV may include a video or audio file with instructions for providing medical support, which the UAV can play out to a person at the target location. As another example, a UAV may include an interactive instruction module to assist a person at the target location in providing medical support. For instance, a UAV may include an application that analyzes the person's speech to detect questions related to the medical situation and/or that provides a text-based interface via which the person can ask such questions, and then determines and provides answers to such questions.

In some embodiments, a UAV 500 may facilitate communication between a layperson and/or medical personnel at the scene and medical personnel at a remote location. As an example, a medical support module 516 may provide a user interface via which a person at the scene can use a communication system 520 of the UAV to communicate with an emergency medical technician at a remote location. As another example, the UAV 500 can unlock certain capabilities of a remote device, such as a mobile phone or other handheld computing device, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

Further, in order to provide medical support at a remote location, a UAV 500 may be configured to transport items to the scene of a medical situation. Such items may aid in diagnosing and/or treating a person who needs medical assistance, or may serve other purposes. Such items may include, as examples: (a) medicines, (b) diagnostic devices, such as a pulse oximeter, blood pressure sensor, or EKG sensor, (c) treatment devices, such as an EpiPen, a first aid kit, a splint, an inhaler, or various kinds of defibrillators (e.g., an AED), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 521 for power.

A UAV 500 may employ various systems and configurations in order to transport items to the scene of a medical situation. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible.

In some implementations, a given UAV 500 may include a "package" designed for a particular medical situation (or possibly for a particular set of medical situations). A package may include one or more items for medical support in the particular medical situation, and/or one or more medical-support modules 516 that are designed to provide medical support in the particular medical situation. In some cases, a UAV 500 may include a package that is designed for a particular medical situation such as choking, cardiac arrest, shock, asthma, drowning, etc.

In other cases, a UAV 500 may include a package that is designed for a number of different medical situations, which may be associated in some way. For example, a dive-accident package may be designed to provide or assist in provision of care in various medical situations that are often associated with a scuba diving accident, such as drowning and/or decompression sickness. Such a dive-accident package might include a flotation device, an oxygen-therapy system, a system for delivering visual and/or audible medical care instructions (e.g., instructions for performing CPR), and/or a signaling device, among other possibilities. A UAV 500 that is configured with such a dive-accident package may be referred to herein as a "dive-rescue" UAV. Such a dive-rescue UAV may be deployed to a diver on the surface of the water, who has just had an accident while scuba diving, with the hope that the UAV can reach the diver and deliver medical treatment sooner than would otherwise be possible.

For instance, provided with the above dive-accident package, the UAV 500 may drop a flotation device to help the diver stay afloat until the diver can be reached by rescuers. In addition, the UAV may include a signaling device, which can be automatically turned on when the UAV locates the diver. Doing so may help a rescue boat locate a diver more quickly. Further, once the diver has been rescued, the UAV may display visual instructions and/or play back auditory instructions for CPR, which may help to revive a drowning victim. Such instructions may be particularly useful in the case where the diver is rescued by non-medical professionals; if the diver is rescued by a passing fishing boat, for example.

Further, when the UAV arrives at the scene of a dive accident or, more likely, once the diver has been moved to a rescue boat, the UAV could provide an oxygen-therapy system, and possibly instructions for use thereof, in order to treat possible decompression sickness. Since a rescue boat might not have oxygen-therapy system, and immediate administration of pure oxygen has been shown to increase the probability of recovering from decompression sickness, such functionality of a UAV could improve treatment for a diver suffering from decompression sickness.

In some embodiments, a UAV 500 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 500 might function as a mobile defibrillator. Specifically, rather than carry a stand-alone defibrillator that can then be removed from the UAV for use, the UAV itself may function as a defibrillator.

As a specific example, a multicopter might include components of an AED that is built into its body, as well as retractable electrode pads for administering a shock to a person who is experiencing a cardiac event or arrest. When the multicopter arrives at the scene of cardiac arrest, the multicopter may land, disable its rotors, and enter a mode where it functions as an AED. Specifically, after landing, the multicopter may release its retractable electrode pads and provide instructions so that a bystander, who might be layperson, could use the electrode pads to administer care to the person with a cardiac arrest. Such instructions may be provided, for example, by displaying text and/or video on a graphic display that is built in to the body of the multicopter, and/or by playing back audio instructions. The multicopter could also include a wireless communication interface via which a bystander could communicate with a live remote operator (e.g., a medical professional at a remote location), in order to receive instructions for using the AED.

Many other examples and variations on the above examples of UAVs with integrated medical-support systems and devices are also possible. For instance, a medical device may be integrated into the structure of a UAV itself when doing so reduces weight, improves aerodynamics, and/or simplifies the use of the device by a person at the scene of the medical situation. Further, those skilled in the art will appreciate that a medical-support system or device may be integrated in the structure of a UAV in other situations and for other reasons.

In some applications, a UAV 500 may be dispatched to the scene of a medical situation to provide early intelligence to medical personnel. In particular, a UAV 500 may be dispatched because it is expected to reach the location of a medical situation more rapidly than medical personnel are able to. In this scenario, the UAV 500 may arrive at the scene and provide early intelligence by communicating information and providing situational awareness to medical personnel. For example, a UAV 500 may use its imaging system(s) 508 to capture video and/or still images at the scene of the medical situation, which the UAV 500 may communicate to medical and/or emergency personnel. As another example, UAV 500 could administer preliminary tests to a person in need, or request that a bystander administer certain preliminary diagnostic tests and/or provide certain information. UAV 500 may then send such test results and/or such information provided by a bystander to medical and/or emergency personnel. A UAV 500 may provide other types of early-intelligence information as well.

By providing early intelligence to medical and/or emergency personnel, a UAV 500 may help the medical and/or emergency personnel to prepare to provide care, such that more effective care can be provided once the personnel arrive at the scene. For instance, a UAV 500 could send video, test results, and/or bystander-provided information to medical personnel while they are travelling in an ambulance on their way to the scene, to firemen or other personnel while they are in a fire truck on their way to the scene, and/or to police they are in a law-enforcement vehicle on their way to the scene, among other possibilities.

It should be understood that the examples of medical-support functionality that are provided herein are not intended to be limited. A UAV may be configured to provide other types of medical-support functionality without departing from the scope of the invention.

V. ILLUSTRATIVE DEVICES

Figure 6:
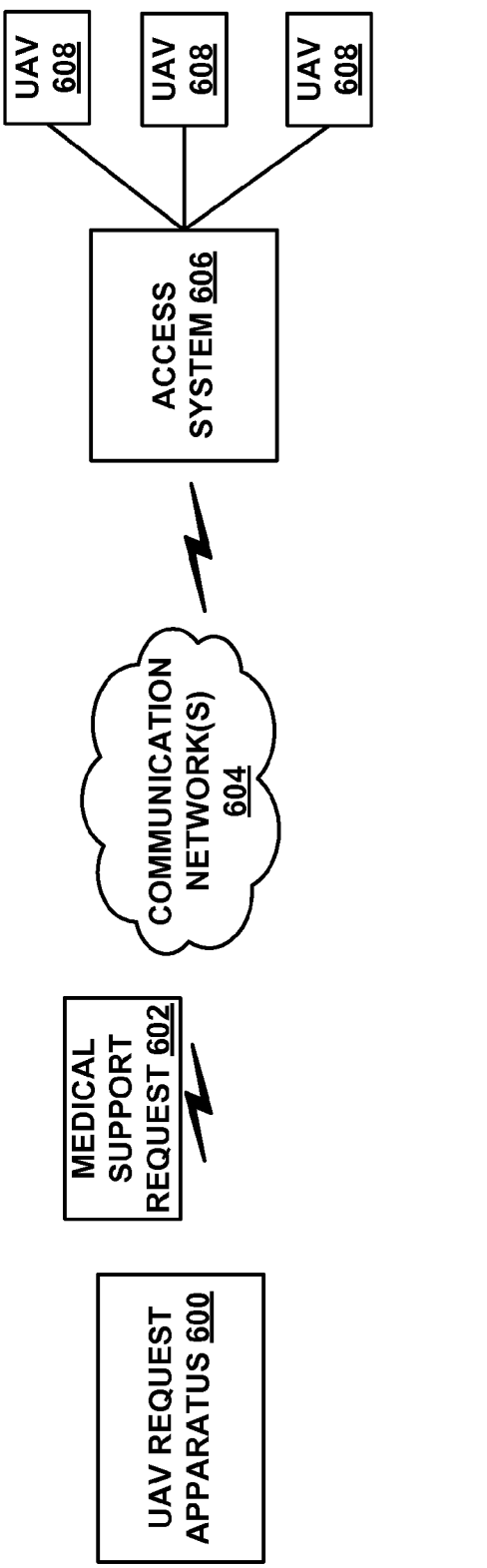
FIG. 6 is a flow chart illustrating a UAV request apparatus and its relation to an access system, according to an example embodiment.

As illustrated in FIG. 6, the remote device may be provided as a UAV request apparatus 600 via which a medical support request 602 can be communicated to an access system for a network of UAVs configured to provide medical support. In an illustrative example, the UAV request apparatus 600 may generate and send a medical support request 602, via communication network(s) 604 to an access system 606, which may allow for interaction with, control of, and/or utilization of a network of medical-support UAVs 608. UAV request apparatus 600 may also be substituted for the remote device 406 shown in the simplified block diagram of FIG. 4.

Figure 7:
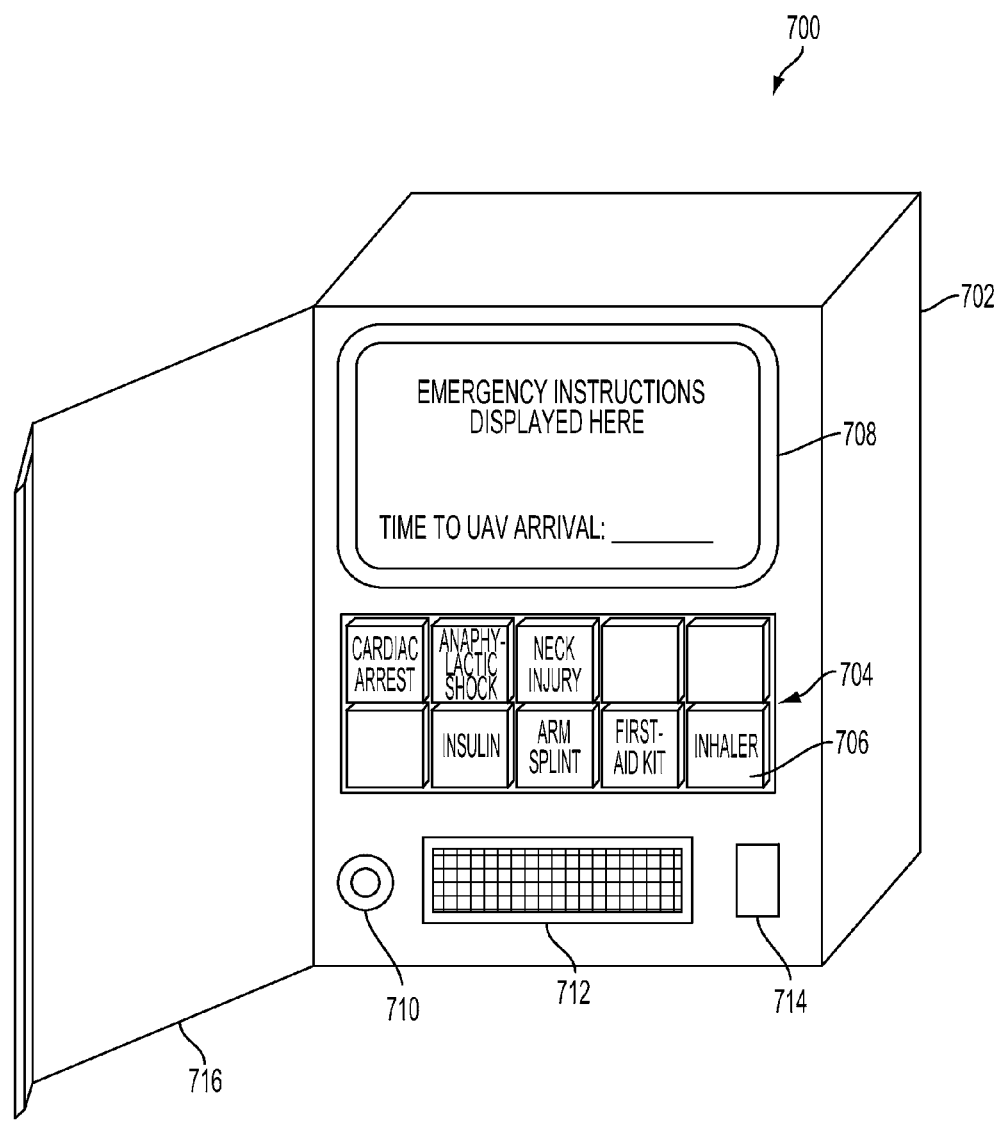
FIGS. 7, 8 and 9 are simplified illustrations of UAV request apparatuses, according to example embodiments.

FIG. 7 is a simplified illustration of a UAV request apparatus 700, according to an example embodiment. In particular, FIG. 7 shows an example of a UAV request apparatus 600 having a housing 702 and at least one interface 704, configured to accept one or more inputs. In this example, the interface 704 includes a plurality of push-buttons 706, each button depicting a particular type of medical situation. The medical situations that may be indicated on the interface 604 may include different types of medical conditions or symptoms such as cardiac arrest, allergic reaction, diabetic shock, trouble breathing, asthma, broken bone, etc., and/or may include types of medical support implements such as an AED, epinephrine, insulin, inhaler, splint, First-AID kit, etc. In an exemplary embodiment, the interface designates a medical situation, such as cardiac arrest, in which a defibrillator is configured to provide medical support.

In some embodiments, the UAV request apparatus 700 may also include display(s) 708, although a display is not required. The display 708 may be permanently fixed to or integrated with the housing 702. The display(s) 618 may be configured to display video, image or textual information or other data sent from the access system, dispatch system or operator thereof, or contained in data storage on the UAV request apparatus. For example, the display(s) may be used to communicate information such as instructions for administering emergency medical care once the UAV arrives, a count-down of the time to arrival of the UAV(s), and/or directions to the exact location where the UAV will land or drop the medical support implement. In another example, the display 708 may also be a touch-screen display configured to accept one or more inputs from a user.

In further embodiments, the display 708 may be removable from the housing. A removable display may include a tablet or other handheld computing device. Further, the UAV request apparatus 700 may be configured such that the removable display may not be removed from the housing 602 until a certain condition is satisfied, such as when a medical-support request is received by the UAV request apparatus's internal control system or received by the access system. The removable display may also be configured to display video, image or textual information or other data sent from the access system, dispatch system or operator thereof, or contained in data storage on the UAV request apparatus or on the removable display itself. Additionally or alternatively, UAV request apparatus 700 may include both a fixed and a removable display.

In a further aspect, UAV request apparatus 700 may allow a person in need of medical assistance and/or a bystander to communicate with the access system or dispatch system or an operator thereof, and vice-versa. For example, the UAV request apparatus 700 may include one or more of a camera 710, a speaker 712 and a microphone 714. The microphone 714 may be configured to capture sound from the UAV request apparatus's environment, including vocal communication from a person in need of medical assistance and/or a bystander. The camera may be configured to capture video and or still-frame images from the UAV request apparatus's environment, including images of the condition of the person in need of medical assistance which may assist the access system or dispatch system in assessing the medical condition. Further, the speaker 712 may be configured to play audio recordings stored in the UAV request apparatus's internal memory, or output verbal communications from a remote source, such as an operator or dispatcher.

In addition, a removable cover 716 may be provided over the UAV request apparatus housing 702 to prevent interface 704 from unintentionally receiving inputs when an emergency medical situation does not exist. The cover 716 may be made of a transparent material, such that the inputs on the UAV request apparatus are readily observable through the cover 716.

Figure 8:
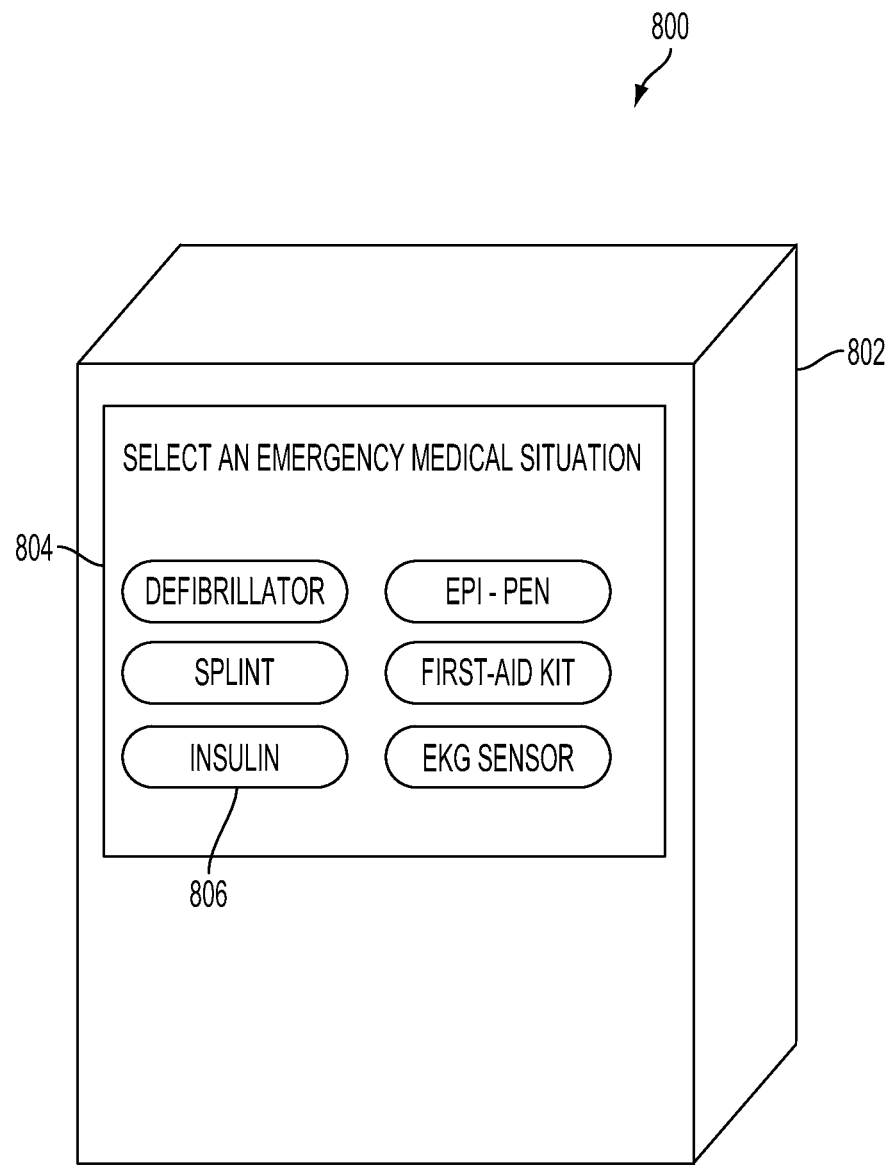

Another example of a UAV request apparatus 800 is shown in FIG. 8. In this example, the interface 804 on the housing 802 may be a touch-screen interface with a plurality of virtual buttons 806, each depicting a particular type of medical situation. Accordingly, interface 804 may constitute both a display and the interface 804 for receiving one or more inputs. Again, the interface designates at least one medical situation in which a defibrillator is configured to provide medical support.

Figure 9:
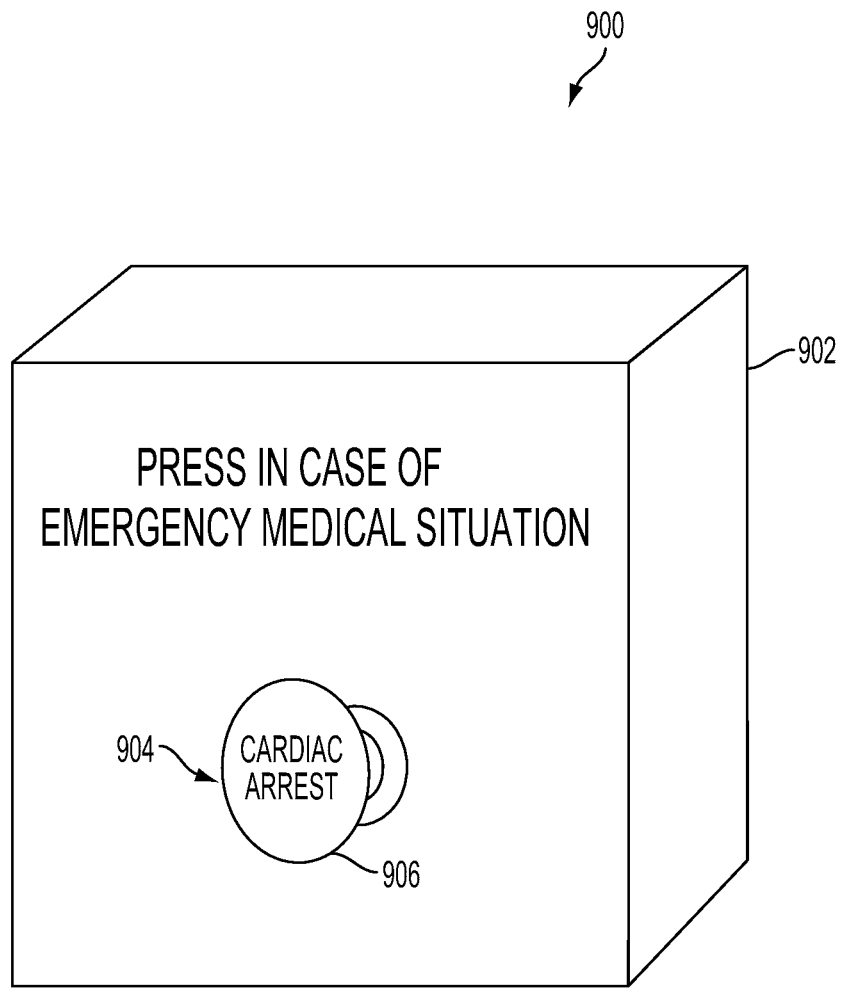

FIG. 9 illustrates a further example of a UAV request apparatus 900. In this simplified example, housing 902 includes an interface 904 provided as a large push button 906 depicting a medical situation—cardiac arrest—in which a defibrillator is configured to provide medical support. Additional embodiments of the UAV request apparatus interface are contemplated.

Figure 10:
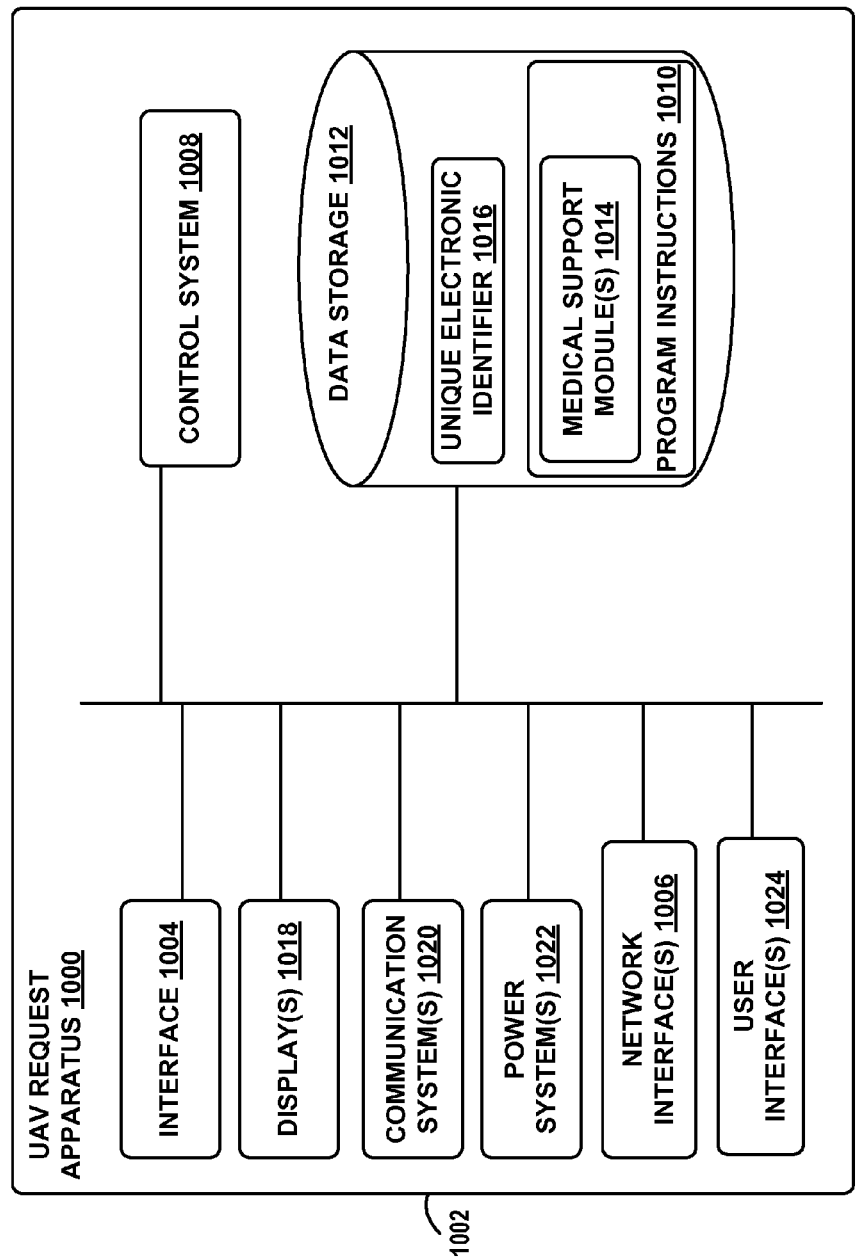
FIG. 10 is a simplified block diagram illustrating components of a UAV request apparatus, according to an example embodiment.

FIG. 10 is a simplified block diagram illustrating components of a UAV request apparatus 1000, according to an example embodiment. All of the components may be provided within a housing 1002. UAV request apparatus 1000 may take the form of or be similar in form to one of the UAV request apparatuses 700, 800 or 900 shown in FIGS. 7, 8 and 0. However, UAV request apparatus 1000 may also take other forms.

UAV request apparatus 1000 may include at least one interface 1004 configured to accept one or more inputs that are each indicative of a particular type of medical situation. The interface 1004 may be of various types. In a further aspect, UAV request apparatus 1000 includes one or more network interfaces 1006. The network interfaces 1006 may include one or more wireless interfaces and/or one or more wireline interfaces, which allow UAV request apparatus 1000 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, POTS interface, or similar interface to communicate via a wire, a twisted pair of wires, a coaxial cable, an optical link, a fiber-optic link, or other physical connection to a wireline network. A first of the network interfaces 1006 may be operable to communicate with an access system for a network of UAVs. A second of the network interfaces 1006 may be operable to communicate with a remote computing system for diagnostic purposes, such as confirming that the UAV request apparatus 1000 has power and that the components of the UAV request apparatus 1000 are functioning properly.

In the illustrated embodiment, the UAV request apparatus 1000 also includes a control system 1008, which may be provided as one or more processors. A processor may be a general-purpose processor or a special purpose processor (e.g., digital signal processors, application specific integrated circuits, etc.). The control system 1008 can be configured to execute computer-readable program instructions 1010 that are stored in the data storage 1012 and are executable to provide the functionality of a UAV request apparatus described herein.

The control system 1008 may be configured to receive, via the at least one interface 1004, one or more inputs that correspond to particular types of medical situations. In one embodiment, the control system 1008 is configured to receive an input that corresponds to a medical situation in which a defibrillator, such as an AED, is configured to provide medical support, such as cardiac arrest. The control system 1008 is further configured to send a medical-support request to the access system in response to receipt of an input from the interface 1004. The medical support request may include an indication of the type of medial situation(s) selected at the interface 1004 and may also include a unique electronic identifier 1016. In operation, a UAV configured to provide medical support for the type of medical situation(s) communicated by the control system 1008 in the medical support request, such as a defibrillator, will be deployed to the UAV request apparatus 1000.

The data storage 1012 may include or take the form of one or more non-transitory computer-readable storage media that can be read or accessed by the control system 1008. The one or more computer-readable storage media can include volatile and/or non-volatile storage components, such as optical, magnetic, organic or other memory or disc storage, which can be integrated in whole or in part with the control system 1008. In some embodiments, the data storage 1012 can be implemented using a single physical device (e.g., one optical, magnetic, organic or other memory or disc storage unit), while in other embodiments, the data storage 1012 can be implemented using two or more physical devices.

As noted, the data storage 1012 can include computer-readable program instructions 1010 and perhaps additional data, such as diagnostic data of the UAV request apparatus 1000. As such, the data storage 1012 may include program instructions to perform or facilitate some or all of the UAV request apparatus functionality described herein. For instance, in the illustrated embodiment, program instructions 1010 include one or more medical-support modules 1014. Program instructions 1010 may also include instructions for the control system 1008 to perform one or more diagnostic tests. The diagnostic tests may be stored on the data storage 1012 and the control system 1008 may be configured to periodically automatically perform the tests. Alternatively, may be sent to the apparatus 1000 via the second network interface 1006 and the control system 1008 may be configured to perform the tests upon receipt. In some examples, the diagnostic tests include tests related to the maintenance of the apparatus 1000, including verifying system functionality of the apparatus and its components, verifying connectivity of the apparatus with a first of the network interfaces, verifying functionality of the interface 1004, etc. The control system 1008 may also be configured to send the results of the diagnostic tests to a remote computing system, such as a server or computer operated by the service provider. As described above, the ability of the apparatus to perform self-diagnostics may provide a significant cost savings over traditional systems, such as installed AEDs.

The data storage 1010 may also include a unique electronic identifier 1016 that is unique to each UAV request apparatus 1000. The unique electronic identifier 1016 may therefore provide a means for identifying the UAV request apparatus from which a medical-support request originated. Further, in such embodiments where the UAV request apparatus is installed in a known and stationary location, communication of the unique electronic identifier 1016 by the control system 1008 to the access system may also provide an indication of the location of the associated UAV request apparatus 1000. The unique electronic identifier 616 may be of various types, such as an IP address or phone number that it may include in a communication to an access system and/or to a dispatch system.

Example medical-support systems may include a plurality of UAV request apparatuses 1000 positioned at known locations throughout a geographic area, such as in residences, commercial buildings and public spaces, so that medical support can be requested by a person in need of such medical support (or by others on behalf of a person in need). The housing of each UAV request apparatus may be fixedly attached to a wall or other structure within the home, building, etc. Accordingly, because the apparatus has a fixed location, this exact location may be quickly and accurately determined by transmission of the apparatus' unique electronic identifier 616. This provides an advantage over other location determination techniques, such as GPS, which may provide only a coarse location, especially in large multi-story buildings.

As discussed above, the UAV request apparatus 1000 may also include display(s) 1018. In a further aspect, UAV request apparatus 1000 may also include communication system(s) 1020 operable to provide a means of communication between the person in need of medical assistance and/or a bystander and the access system or dispatch system or an operator thereof. The communication system(s) 1020 may include microphones, speakers and/or cameras. A user interface 1024 may also be provided on the housing. The user interface 1024 may be configured to accept one or more inputs from a user of the UAV request apparatus. The inputs may be received via one or more mechanical interface features, such as a keyboard, navigation buttons, or scroll wheel, or one or more touch-sensitive features, such as a touch-screen display or touch-sensitive track-pad. In some examples, components such as a touch-screen display may provide the functionality of one or more of the interface 1004, display 1018 and user interface 1024.

In a further aspect, UAV request apparatus 100 may include power system(s) 1022. A power system 1022 may include a connection to a building's electrical system and/or one or more batteries for providing power to the UAV request apparatus 1000. In one example, the one or more batteries may be rechargeable and each battery may be recharged via a wired connection between the battery and a power supply and/or via a wireless charging system, such as an inductive charging system that applies an external time-varying magnetic field to an internal battery.

As noted above, UAV request apparatus 1000 may include one or more medical-support modules 1014. The one or more medical-support modules 1014 include software, firmware, and/or hardware that may help to provide or assist in the provision of the medical-support functionality described herein. Configured as such, a UAV request apparatus 1000 may provide or assist in the provision of medical support in various ways.

The medical support module 1014 may be configured to interact with other components of the UAV request apparatus 1000. For example, the medical support module 1014 may be configured access data stored in the data storage 1012, display videos, images, text or other data to the display 1018, play sound data on a speaker of the communication system 1012, activate a camera of the communication system 1012 to gather still or video images, transmit data via the network interface 1006 and accept inputs from the user interface 1024.

For instance, a UAV request apparatus 1000 may have information that can be provided to a person in need of assistance or persons nearby, in order to assist the person or persons in providing medical care stored in the data storage 1012. The medical support module 1014 may be configured to access this information, in the form of data, image, video or audio files containing instructions for providing medical support, sored in the data storage 1012. The medical support module 1014 may further be configured to read out this information, such as by displaying text or an image or playing a video file on the display 1018 or playing a sound file on a speaker of the communication system 1020. The stored instructions may include guidance on how to use or administer the medical support implement delivered by the UAV. For example, the instructions may include step-by-step instructions for how to use a defibrillator to assist someone suffering from cardiac arrest, including guidance on where to place the electrode pads, how to charge the device and whether and when to administer a shock. The instructions may further include a guide for administering CPR or a guide for administering a dose of insulin or epinephrine.

As another example, a medical support module 1014 may include an interactive instruction module to assist a person at the UAV request apparatus in providing medical support. For example, the program may include a database of "Frequently Asked Questions" (FAQs) related to using or administering the delivered medical support implement. Further, the interactive instruction module may include a search function for searching a database of information or FAQs regarding the delivered medical support implement stored in the data storage 1012. The module may also include step-by-step instructions that may be adjusted or tailored based on input from the person administering support. For example, the module may prompt the person administering support to input certain health-related parameters of the person suffering from the medical condition, such as temperature, heart rate, respiratory rate, state of consciousness, symptoms, location of injury or pain. The module may obtain this information with drop-down menus or by prompting the person administering support to answer questions related to the health parameters, i.e. "Is the person conscious? Y/N"; "Can you feel a pulse? Y/N". Based on this input, the interactive module may adjust the step-by-step instructions to better assist the person suffering from the medical condition. The medical support module may receive these health-related parameters via the user interface which is configured to accept one or more inputs each indicative a health parameter of the person suffering from a medical condition.

The medical support module 1014 may also be configured to provide a means for the user of the UAV request apparatus to communicate with an emergency medical professional at a remote location, either via the communication system 1020 or the user interface 1024. The interface 1024 may include a means for the person providing emergency assistance to communicate with an operator, dispatcher, or medical professional to, for instance, as questions or receive real-time guidance on how to use or administer the medical support implement, such as by video or voice communication. Via this communication, the operator, dispatcher, or medical professional may provide step-by-step instructions to the person providing assistance for using or administering the medical support implement delivered by the UAV. If the communication system 1020 of the example UAV request apparatus 1000 includes a camera, the remote operator, dispatcher, or medical professional may also view, guide and provide comment on the actions taken by the person providing assistance. Further, the medical support module 1014 may be configured to connect to an operator, dispatcher or emergency medical professional over a phone or other voice connection or a video call. The user interface 1006 may also include a keyboard for textual communication.

Further, the medical support module 1014 may also be configured to activate the display 1018 to read out graphics, images or text, such as a map illustrating the exact target landing point of the dispatched UAV and textual instructions on how to get there. The display may also read out a map or satellite image illustrating the flight path, current location and/or distance of the dispatched UAV and may also display a clock or timer for designating the time of or counting down the time to arrival of the UAV. Other examples are also possible.

The data storage 1012 may also contain program instructions 1010 for unlocking certain capabilities of a device remote to the UAV request apparatus 1000, such as a mobile phone or other handheld computing device, which is near the apparatus 1000 at the scene of a medical situation. Such capabilities may be inaccessible to a user of the remote device, unless the remote device is within a certain distance from the UAV request apparatus 1000. Further, the program instructions may not unlock these capabilities until a medical situation has been indicated at the UAV request apparatus 1000. For example, once a medical situation has been received by the control system 1008, a UAV request apparatus 1000 may send the remote device a security key that allows the remote device to establish a secure connection to communicate with medical personnel at a remote location or to receive data from the apparatus 1000 itself. In particular, the remote device may be activated to act much like the removable display discussed above and may, for example, receive instructions transmitted from the UAV request apparatus 1000 for providing medical support or directions to meet the UAV at its target destination. Other examples are also possible.

Generally, in application, a service provider may sell these UAV request apparatuses and the emergency medical service with UAVs to individuals or businesses. The service provider may charge a fee for installation of the UAV request apparatus in a home, business or public space and a service fee to have access to the emergency medical service, such as on a monthly subscription basis. As described above, traditional installed medical support implements, such as AEDs, can be very expensive to not only purchase, but install and maintain. The expense of these traditional systems are often prohibitive to individuals, home owners, small business owners or others that may desire to provide on-site emergency medical support implements, such as AEDs. By offering less expensive pricing than these traditional installed systems, the example systems and UAV request apparatuses may be more attainable for home owners and other small-scale markets. In particular, the UAV request apparatuses themselves may be much less expensive than an AED, may cost less to install and, because of its automatic maintenance functionality, may cost very little to maintain.

VI. CONCLUSION

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

The invention claimed is:

1. An apparatus comprising:
a housing having at least one interface configured to accept one or more inputs that are each indicative of a particular type of medical situation, wherein the housing is fixedly installable at a known location;
a first network interface disposed in the housing, wherein the first network interface is operable, when the housing is fixedly installed, to communicate with an access system for a network of autonomous unmanned aerial vehicles (UAVs) that are configured for providing medical support, based, at least in part, on medical information from an associated user-account, wherein at least one of the autonomous UAVs is configured to deliver a defibrillator; and
a control system disposed in the housing, wherein the control system is configured, when the housing is fixedly installed, to:
receive, via the at least one interface, a first input that corresponds to a first type of medical situation in which a defibrillator is configured to provide medical support; and
in response to receipt of the first input, send a medical-support request to the access system via the first network interface, wherein the medical-support request comprises a unique electronic identifier for the apparatus, wherein the unique electronic identifier is indicated by the user-account, and a request for delivery of medical support by an autonomous UAV at a location associated with the unique electronic identifier according to the user-account, wherein the medical support includes a defibrillator and is based, at least in part, on the medical information and a payment-based service level from the associated user-account.

2. The apparatus of claim 1, wherein the at least one interface comprises one or more mechanical interface features.

3. The apparatus of claim 2, wherein the mechanical interface features comprise one or more of: a button, a knob, a lever, a switch, and a dial.

4. The apparatus of claim 1, further comprising at least one display disposed on the housing.

5. The apparatus of claim 4, wherein the at least one display comprises a touch-screen display.

6. The apparatus of claim 4, wherein at least one display is detachable from the housing.

7. The apparatus of claim 6, wherein the detachable display is configured to be locked to the housing until receipt of a first input by the control system.

8. The apparatus of claim 6, wherein said detachable display is a handheld computing device.

9. The apparatus of claim 1, further comprising a data storage, the data storage containing information for communication to a user including instructions for providing medical support for the input medical situation.

10. The apparatus of claim 9, wherein the information includes instructions for using the defibrillator delivered by a UAV.

11. A non-transitory computer readable medium having stored therein instructions that are executable to cause a control system to perform functions comprising:
receiving, via an interface of an apparatus comprising a housing fixedly installed at a known location, a first input that corresponds to a first type of medical situation in which a defibrillator is configured to provide medical support; and
in response to receipt of the first input, sending, via a network interface, a medical-support request to an access system for a network of autonomous unmanned aerial vehicles (UAVs) that are configured for providing medical support based, at least in part, on medical information from an associated user account, wherein the medical-support request comprises:
a unique electronic identifier for the apparatus, wherein the unique electronic identifier is indicated by the associated user-account;
an indication of the first type of medical situation: and
a request for delivery of medical support by an autonomous UAV to a location associated with the unique electronic identifier according to the user-account, wherein the medical support provides a defibrillator and is based, at least in part, on the medical information and a payment-based service level from the associated user-account, and wherein the unique electronic identifier is associated with a fixed location of the apparatus.

12. The non-transitory computer readable medium of claim 11, wherein the interface is configured to accept one or more inputs that are each indicative of a particular type of medical situation.

13. An apparatus comprising:
a housing having at least one interface configured to accept one or more inputs that are each indicative of a different type of medical situation, wherein the housing is fixedly installable at a known location;
a first network interface disposed in the housing, wherein the first network interface is operable, when the housing is fixedly installed, to communicate with an access system for a network of autonomous unmanned aerial vehicles (UAVs) that are configured for providing medical support based, at least in part, on medical information from an associated user-account; and
a control system disposed in the housing, wherein the control system is configured, when the housing is fixedly installed, to:
receive, via the at least one interface, one or more inputs that each correspond to a different type of medical situation; and
in response to receipt of the one or more inputs, send a medical-support request to the access system via the first network interface, wherein the medical-support request comprises a unique electronic identifier for the apparatus, wherein the unique electronic identifier is indicated by the associated user-account, and a request for delivery of medical support by an autonomous UAV at a location associated with the unique electronic identifier according to the user account, wherein the medical support provides one or more medical support implements configured to provide support for the received inputs corresponding to different types of medical situations and based, at least in part, on the medical information and a payment-based service level from the associated user-account.

14. The apparatus of claim 13, further comprising a data storage, the data storage containing information for communication to a user including instructions for providing medical support for the input medical situation.

15. The apparatus of claim 14, further comprising a user interface configured to accept one or more inputs each indicative of a health parameter of a person suffering from a medical condition.

16. The apparatus of claim 15, further comprising an interactive instruction module, said module configured to communicate instructions for providing medical support for the input medical situation, said instructions based at least in part on said one or more inputs each indicative of a health parameter.

17. The apparatus of claim 14, further comprising a communication system configured to provide communication between a user of said apparatus and an emergency medical technician at a remote location.

18. The apparatus of claim 17, wherein said communication system comprises one or more of a microphone, a camera, a speaker and a display.

19. The apparatus of claim 14, wherein said control system is further configured to execute instructions for performing one or more self-diagnostic tests.

20. The apparatus of claim 19, wherein said one or more self-diagnostic tests comprise one of verifying system functionality of the apparatus, verifying connectivity of the apparatus with the first network interface, and verifying functionality of the at least one interface.

21. The apparatus of claim 20 further comprising a second network connection configured to communicate instructions for performing one or more self-diagnostic tests from a remote computing device to the apparatus.

* * * * *